United States Patent [19]

Sakagami et al.

[11] Patent Number: 4,826,284
[45] Date of Patent: May 2, 1989

[54] RESIN-MADE HEAT-RESISTANT OPTICAL FIBER

[75] Inventors: Teruo Sakagami; Yasufumi Fujii, both of Iwaki, Japan

[73] Assignee: Kureha Kagaku Kogyo Kabushiki Kaisha, Tokyo, Japan

[21] Appl. No.: 22,817

[22] Filed: Mar. 6, 1987

[30] Foreign Application Priority Data

Mar. 18, 1986 [JP] Japan ................................. 61-58394

[51] Int. Cl.⁴ ................................................ G02B 6/16
[52] U.S. Cl. ................................. 350/96.34; 428/378; 428/394; 428/398
[58] Field of Search ..................... 350/96.34; 428/373, 428/375, 376, 378, 394, 397, 398

[56] References Cited

U.S. PATENT DOCUMENTS

| | | | |
|---|---|---|---|
| 4,186,409 | 1/1980 | McMullin | 350/96.11 X |
| 4,552,431 | 11/1985 | Allemand et al. | 350/96.34 |
| 4,575,188 | 3/1986 | Ueba | 350/96.34 |
| 4,576,438 | 3/1986 | Tatsukami et al. | 350/96.34 |
| 4,681,400 | 7/1987 | Ueba et al. | 350/96.34 |
| 4,687,295 | 8/1987 | Koishi et al. | 350/96.34 |

Primary Examiner—John D. Lee
Assistant Examiner—Phan Heartney
Attorney, Agent, or Firm—James Creighton Wray

[57] ABSTRACT

A resin-made heat-resistant optical fiber is formed of a core of a hardened thermosetting resin and a cladding of a polymer or copolymer having a refractive index smaller by at least 1%, preferably, at least 3% than that of the core. The thermosetting resin is selected from the group consisting of epoxy resins, phenol resins and urethane resins. The polymer or copolymer may preferably be a thermoplastic organic resin.

4 Claims, 1 Drawing Sheet

RESIN-MADE HEAT-RESISTANT OPTICAL FIBER

BACKGROUND OF THE INVENTION (1) Field of the Invention:

This invention relates to a resin-made optical fiber having excellent heat resistance.

(2) Description of the Prior Art:

It has been known over many years to use light-carrying optical fibers, each of which is composed of a core and a cladding on the outer wall of the core, as information transmitting means. Both glass-made and resin-made optical fibers are now actually employed. Although resin-made optical fibers are somewhat inferior in light-carrying capacity to their glass-made counterparts at the present time, they have practically advantageous merits such that they can be connected together rather easily, have light weights and superb flexibility, and can be fabricated at relatively low costs. For these merits, resin-made optical fibers have recently been finding utility in various fields.

As one of conventional fabrication processes of such resin-made optical fibers, a method has been known in which a highly-transparent and optically amorphous polymer or copolymer such as polymethyl methacrylate, polystyrene, polycyclohexyl methacrylate or polyphenyl methacrylate is prepared at first, the polymer or copolymer is melt molded to form a fibrous member by an extruder or the like, and then the fibrous member is covered as a core with a cladding by dipping technique, coextruding technique or the like. Specifically, it is disclosed, for example, in Japanese Patent Publication No. 42261/1978 and 42260/1978 that a monomer capable of providing a polymethyl acrylate polymer or copolymer having excellent transparency, mechanical properties, weatherability, etc., is used by way of example, impurities are removed from the monomer to avoid any detrimental effects to the light-carrying capacity, the thus-purified monomer is polymerized by the continuous bulk polymerization process to obtain a polymer, and the polymer is thereafter molten and molded to obtain a fiber useful as a core.

In conventional fabrication processes such as those described above, fibrous members useful as cores are fabricated by melt molding. Corollary to this, their materials, namely, polymers must have excellent melt moldability. For this reason, the provision of polymers with improved melt moldability has been the subject of a great deal of work, including the addition of various chain transfer agents or the like upon polymerization with a view toward reducing the molecular weights of polymers to be obtained finally and hence lowering their melt viscosities.

Such prior art processes however preclude the use of resin materials the melt molding of which is not feasible, for example, resin materials exhibiting poor stability at high temperatures to which they are exposed upon their melt molding, those having large molecular weights and hence high melt viscosities, crosslinked polymers the melting of which is difficult, etc. Reflecting today's wide-spread adoption of resin-made optical fibers owing to the diversification of the information industry, a variety of properties are now required for resin-made optical fibers. This had led, for example, to the demand for resin-made optical fibers having high heat distortion temperatures so as to possess sufficient heat resistance at high temperatures or resin-made optical fibers having sufficient flexibility even at high temperatures.

As an optical fiber excellent in both heat resistance and environmental resistance, European Patent Specification No. 153514 discloses an optical fiber making use of polysiloxane, which is an inorganic thermosetting resin, as a core material. In this optical fiber, the core-forming polysiloxane is inorganic in nature. Its bonding to an organic polymer, which forms the cladding of the optical fiber, is hence not sufficient. The optical fiber is accompanied by another disadvantage that the refractive index of the polysiloxane is small and a significant limitation is thus imposed on the selection of materials usable for the formation of the associated cladding.

SUMMARY OF THE INVENTION

With the foregoing in view, an object of this invention is to provide a resin-made heat-resistant optical fiber which permits the formation of its core without relying upon melt molding.

In one aspect of this invention, there is thus provided a resin-made heat-resistant optical fiber comprising a core of a hardened thermosetting resin and a cladding of a polymer or copolymer having a refractive index smaller by at least 1% than that of the core. The thermosetting resin being selected from the group consisting of epoxy resins, phenol resins and urethane resins.

The resin-made heat-resistant optical fiber can be fabricated, for example, by filling a clad preform in the form of a hollow fiber, which is made of a polymer or copolymer and serves to form a cladding, with a flowable core material composed of at least one of thermosetting resins, polymerizable monomers capable of yielding thermosetting resins and mixtures thereof, and then subjecting the resultant composite material to a treatment inclusive of a heating step so as to convert the core material into a hardened thermosetting resin, thereby to form a core having a refractive index at least 1% greater than that of the cladding. The flowable core material is chosen so as to give a thermosetting resin selected from the group consisting of epoxy resins, phenolic resins and urethane resins.

By using a fabrication process such as that described above, the present invention has made it possible to materialize a resin-made optical fiber equipped with a core made of a specific hardened heat-resistant organic thermosetting resin which does not permit melt forming. In contrast to other processes in which there is a significant potential danger of mixing of impurities upon formation of a core, the above-mentioned fabrication process and its analogous processes have such advantages that so long as the core material is sufficiently purified before-hand, there is theoretically no potential danger of mixing of impurities and a resin-made optical fiber having excellent light-carrying capacity can be obtained without exception.

BRIEF DESCRIPTION OF THE DRAWING

The above and other objects, features and advantages of the present invention will become apparent from the following description and the appended claims, taken in conjunction with the accompanying sole drawing, in which:

DETAILED DESCRIPTION OF THE INVENTION AND PREFERRED EMBODIMENTS

Figure 1:
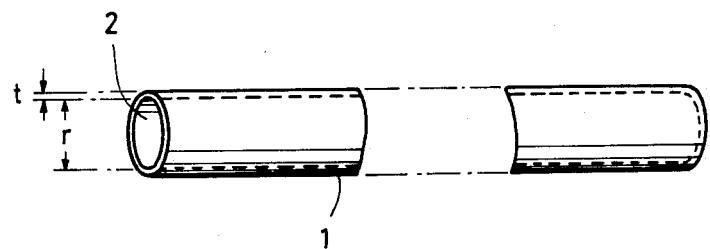
FIG. 1 is a schematic perspective view of an exemplary clad preform useful in the fabrication of a resin-made optical fiber according to this invention.

As illustrated in FIG. 1, a clad preform 1 in the form of a hollow fiber, which is to be converted into the cladding of an optical fiber, is formed in the present invention. No particular limitation is imposed on the material of the clad preform 1. A material of a conventional clad can be used as it is. It is however essential that its refractive index is lower by at least 1% than that of the associated core which will be described subsequently. Since an organic thermosetting resin having a high refractive index is usually used as a core material in the present invention, the present invention has an advantage that the material of the clad preform 1 can be chosen from a broad range of materials. The material of the clad preform 1 may preferably be a thermoplastic resin which permits melt molding.

As exemplary polymers proposed as materials for such clad preforms, may be mentioned those disclosed in U.K. Patent Specification No. 1,037,498, for example, polymers or copolymers of vinyl fluoride, vinylidene fluoride, tetrafluoroethylene, hexafluoropropylene, trifluoromethyl trifluorovinyl ether, perfluoropropyl trifluorovinyl ether, and fluoroesters of an acrylic acid or methacrylic acid represented by the following structural formula:

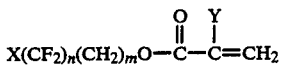

wherein X means F, H or Cl, n stands for an integer of 2-10, m is an integer of 1-6, and Y denotes $CH_3$ or H, as well as copolymers of the above-mentioned monomers and esters of acrylic acid or methacrylic acid and lower alcohols (for example, methanol, ethanol, etc.).

Furthermore, substantially amorphous copolymers which may be obtained from a compound represented by the following formula:

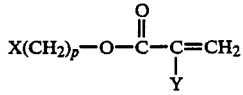

wherein X and Y have the same meaning as defined above and p stands for an integer of 1-16, and the methyl or ethyl ester of acrylic acid or methacrylic acid may also be employed suitably. Besides, the tetrafluoroethylene-ethylene copolymer and the like disclosed in U.S. Pat. No. 2,468,664 may also be used suitably.

Since the thermosetting resin used as a core material has a high refractive index in the present invention, the present invention also permits, in addition to the above-described polymer and copolymers, the use of ethylene resins, propylene resins, 4-methyl-pentene-1 resins, vinyl chloride resins, vinylidene chloride resins and like resins as materials for clad preforms.

The clad preform 1 can be obtained by molding a polymer such as those described above into a tubular hollow fiber having a hollow channel 2. Any conventionally-known process may be employed as a process for the formation of the tubular hollow fiber. It may be fabricated, for example by continuously molding a suitable polymer in a high-temperature molten state into a tubular shape by an extruder or the like. No particular limitation is vested on the diameter r of the hollow channel 2. Although the hollow channel 2 may have a suitable diameter corresponding to the application purpose of the optical fiber as a final product, the diameter is usually from 1 μm to 1 cm or so. This diameter of the hollow channel 2 substantially becomes the diameter of the core. When the optical fiber is used as an optical fiber for transmitting light from a large light source, for example, a light-emitting diode (LED), the greater the diameter of the hollow channel 2, the more advantageous. When the light to be transmitted is the light from a small light source like laser beam, smaller core diameters are more suitable for the admission of the incident light. Hence, a small diameter is chosen for the hollow channel 2. In this case, another merit is brought about that the minimum bend radius is kept small.

Since the cladding preform 1 becomes the cladding for reflecting light which propagates through the core, no limitation is imposed on the wall thickness t of the cladding preform so long as the wall thickness is at least several times the wavelength of light to be transmitted. The wall thickness t is set generally at 5–100 μm, preferably 10–50 μm or so.

The optical fiber of this invention can be fabricated by filling the hollow channel 2 of the clad preform 1, which is in the form of such a tubular hollow fiber as mentioned above, with a flowable core material capable of forming a hardened specific organic thermosetting resin by a treatment inclusive of a heating step, and then heating the resultant composite material to harden the core material. The core material is hence converted into a hardened thermosetting resin, thereby forming a core.

The core material is composed of a polymer in a state hardenable under heat, namely, an organic thermosetting resin selected from the group consisting of epoxy resins, phenol resins and urethane resins, a polymerizable monomer capable of yielding the above-mentioned thermosetting resin upon its hardening under heat, or a mixture containing the above-mentioned thermosetting resin or polymerizable monomer as a resin component in combination with one or more other components. The term "polymerizable monomer" as used herein means a monomer for a thermosetting resin, a thermosetting resin precursor, or a thermosetting resin prepolymer which has undergone polymerization to a certain extent. When used in the form of a mixture, the other components may include a hardener, a plasticizer and/or the like. It is essential that the core material has flowability.

As a consequence, any material may be employed as a core material in this invention so long as it has flowability sufficient to permit filling of the hollow channel 2 of the clad preform 1 with the same and is the above-described specific thermosetting resin, which is hardenable under heat, or can afford such a thermosetting resin. It is hence possible, for example, to dissolve the above-mentioned specific thermosetting resin or a polymerizable monomer, which can afford such a thermosetting resin but is in a solid form before application of heat, in an organic solvent having a relatively low boiling point, thereby obtaining a flowable solution. The flowable solution is then poured as a core material into a clad preform. Either simultaneously with or after the pouring of the flowable solution, the solvent is caused to evaporate under reduced pressure or heat so that the resin component and the like, which still remain in the hollow channel of the clad preform, are hardened.

Therefore, the resin component of the core material useful in the practice of this invention may preferably be in a liquid form at room temperature or a little higher temperature. It is however not essential that the resin component itself is liquid. It is still usable so long as it can be converted by a suitable method into such a liquid as permitting its filling into the hollow yarn at room temperature.

It is indeed the principal merit of this invention that a core can be formed without relying upon melt forming.

In the present invention, it is not absolutely necessary that the core is formed solely of the above-described specific thermosetting resin. It is possible, for example, to include a plasticizing material miscible uniformly with the specific thermosetting resin which is used to form the core. Where such a plasticizing material is contained, the resulting core has substantial flexibility, resulting in a merit that large bending strength is imparted.

In the present invention, an organic thermosetting resin selected from the group consisting of epoxy resins, phenol resins and urethane resins is used as a core material. These organic thermosetting resins are usually higher in refractive index compared with inorganic thermosetting resins such as polysiloxane. They have hence have an advantage over the inorganic thermosetting resins that the material for forming the clad preform can be selected from a wide range of materials. As the thermosetting resin to be used for the formation of a core in the present invention, it is preferable to use a thermosetting resin having a refractive index of 1.52 or higher.

As epoxy resins, those employed industrially in a variety of fields may also be used. Primarily, bisphenol epoxy resins are used widely. Of course, usable epoxy resins are not necessarily limited to them. Bisepoxides such as alicyclic and aliphatic bisepoxides as well as their mixtures may also be used preferably as core materials.

A hardener for such an epoxy resin is incorporated in the core material. Diamines and acid anhydrides are typical examples of the hardener. Besides, various organic acids, polyamides, amides, fatty acid salts of tertiary amines, amine complexes of trifluoroboron, and other hardeners may also be employed in accordance with the kind of each epoxide to be used. Mixed systems of bislactone and bisepoxide may also be used in some instances.

Both novolak and resol resins can be used as phenol resins. Each of these resins is hardened to form a core when heated in the presence of a hardener. When one of various phenols or phenol derivatives is reacted with formaldehyde to obtain a phenol resin, use of an acid or alkali as a catalyst results respectively in the formation of a novolak or resol resin as an initial reaction product. Accordingly, it is also possible to use such a prepolymer as a resin component of a core material in the present invention.

When a novolak resin in the form of a thick liquid or solid is employed by way of example, a conventional amine-base hardener such as hexamethylene-tetramine is added to the novolak resin to obtain a liquid core material having flowability. The liquid core material is filled within the hollow channel of a clad preform and is then hardened under heat to form a core. When a resol resin is used on the other hand, it can be heated and hardened by using an acid catalyst.

A hardenable polyurethane is formed by reacting one of various polyisocyanates such as diisocyanates and a polyhydric alcohol material containing a polyol with 3 or more hydroxyl groups, or a polyamino material containing a polyamine with at least 3 amino groups. The hardenable polyurethane is also useful as a core material in this invention.

The above-described thermosetting resins can form cores having good heat resistance.

As exemplary plasticizing materials which can be incorporated in the above-mentioned thermosetting resins useful in the formation of cores, may be mentioned polymers having relatively high miscibility with core-forming resins, such as liquid or wax-like polyethylene glycol and polypropylene glycol. Addition of such a plasticizing material is effective in facilitating the filling of the core material into the hollow channel of the clad preform or imparting flexibility to the hardened core.

The hollow channel 2 of the clad preform 1 can be filled with such a flowable core material as mentioned above, for example, by dipping one end of the clad preform in the core material in a container and then applying a negative pressure to the other end of the clad preform so as to draw the core material into the clad preform or by filling under pressure the core material through one end of the clad preform.

The hardening treatment may be carried out by heating the composite material, which has been obtained by filling the clad preform with the core material, to a suitable temperature commensurate with the type of the thermosetting resin component used in the core material. When the resin component of the core material is a polymerizable monomer capable of yielding a thermosetting resin, the hardening treatment may be applied after subjecting the composite material to a polymerization treatment in advance. It is however possible to achieve the hardening and polymerization at once especially when the polymerizable monomer can be polymerized by heat.

Upon heating the composite material for the above-mentioned hardening, the composite material may be placed in its entirety within an inert atmosphere of nitrogen gas or the like. Depending for example on the type of the core-forming resin, the heating of the core material may be effected by placing the entire composite material in a high-temperature heating room such as oven or by transporting the composite material through a high-temperature zone in such a manner that the composite material enters the high-temperature zone from one end and advances slowly through the high-temperature zone. The latter method has an advantage that the truly circular shape of the clad preform can also be retained sufficiently in the optical fiber obtained at the end even when the resin component of the core material undergoes considerable polymerization shrink upon its hardening, because the core material is allowed to move within the clad preform as its shrinkage proceeds.

According to the present invention, it is possible to form, within a cladding, a core of a hardened thermosetting resin crosslinked three-dimensionally to a high degree and having excellent heat resistance. Another merit has also been obtained that the core has high bonding strength to the clad-forming organic polymer or copolymer, because the core is made of a material selected from organic epoxy resins, phenol resins and urethane resins. It is hence possible to provide a resin-made optical fiber having sufficient practical applicability even under conditions where substantial heat resistance is required. A further merit has also been obtained that the material of the cladding can be chosen from a broad range of materials, since the core-forming specific thermosetting resin has a high refractive index.

[EXAMPLES]

Certain examples of this invention will next be described. It should however be borne in mind that the present invention is not limited to or by the following examples.

EXAMPLE 1

A vinylidene fluoride resin "KF #1000" (trade name; product of Kureha Chemical Industry Co., Ltd.) was extrusion molded at an outlet temperature of 240° C. to obtain a hollow clad preform made of the vinylidene fluoride resin and having an inner diameter of 1.0 mm and a wall thickness of 0.028 mm. The refractive index of that resin was about 1.42 at 25° C.

On the other hand, a bisphenol A type monomer for epoxy resin, "EPOTECK-301" (trade name, product of Epoxy Technology Inc., U.S.A.; viscosity: 1,000 cps at 25° C.), which had been filtered and purified, was provided as a core material in a closed vessel. One end of the clad preform was then dipped in the core material stored in the closed vessel and the other end was connected to a vacuum pump, thereby filling the clad preform with the core material to obtain a composite material. The composite material was then allowed to stand for 2 hours in an oven the temperature of which was set at 65° C., so that the monomer for the epoxy resin was hardened to form a core. As a result, an optical fiber of this invention was fabricated.

The refractive index of the epoxy resin core of the optical fiber was about 1.580 at 25° C.

The optical transmission loss ($\alpha$) of the optical fiber was then determined. It was found to be about 1,600 dB/km at 25° C. It had sufficient light carrying capacity even at temperatures as high as 120° C., thereby proving the possession of high heat resistance.

Incidentally, the optical transmission loss ($\alpha$) is a value obtained as a result of a calculation in accordance with the following equation:

$$\alpha = \frac{10}{l} \log \frac{I_0}{I_l} \text{ (dB/km)}$$

where
l: length of the optical fiber (km),
$I_0$: light quantity at the emitting end face when the optical fiber had the standard length $l_0$, and
$I_l$: light quantity at the emitting end face when the optical fiber had a length l.

The measurement of $I_0$ and $I_l$ was performed in the following manner. Setting the standard length at 10 m (i.e., $l_0$=10 m), both end portions of the fiber was cut at right angles to the axis of the fiber to obtain smooth faces. Using the above-cut fiber as a sample, light from a light source apparatus "MG 927A" (manufactured by Anritsu Electric Mfg., Co., Ltd.), which was equipped with a light-emitting diode having a light-transmitting wavelength of 660 nm, was caused to enter the sample through one end thereof and the light quantity on the emitting end face was detected by a photo detector (manufactured by Anritsu Electric Mfg., Co., Ltd.), which was constructed of a handy light power meter.

EXAMPLE 2

In the same manner as in Example 1, a polyvinylidene fluoride clad preform of the same type as that employed in Example 1 was filled with a mixture composed of 100 parts by weight of the epoxy resin monomer "EPOTECK-301" and 5 parts by weight of fully-purified polyethylene glycol (molecular weight: about 1,000) so as to obtain a composite material. The composite material was then subjected to a heat treatment under the same conditions as in Example 1, thereby obtaining an optical fiber of this invention.

The refractive index of the core of the optical fiber was about 1.522 at 25° C.

In addition, the optical transmission loss of the optical fiber was determined in the same manner as in Example 1. It was found to be about 1,800 dB/km at 25° C. Moreover, the optical fiber was excellent in flexibility. It was not broken up even when a 5 cm-long portion thereof was left over in a stage bent over 180 degrees. It had sufficient light carrying capacity even at a high temperature of 120° C., thereby proving the possession of high heat resistance.

EXAMPLE 3

A copolymer, which had been obtained by polymerizing vinylidene fluoride and tetrafluoroethylene at a weight ratio of 80:20, was extrusion-molded to obtain a clad preform in the form of a hollow fiber. The inner diameter and wall thickness of the clad preform were 1 mm and 0.045 mm respectively. The refractive index of the polymer of the clad preform was 1.406 at 25° C.

A test piece of 3 m long was cut out from the clad preform. Following the procedure of Example 1, the hollow channel of the test piece was filled with a solution which had been prepared by filtering and purifying a phenol resin monomer "Ply-O-Fen TD477" (product of DAINIPPON INK AND CHEMICALS, INC.) and then concentrating same to a resin content of 40%. Thereafter, one end of the clad preform was sealed. The resultant clad preform was then held upright with the other end, i.e., the opening end up. In that upright position, the volatile solvent of the phenol resin monomer was caused to evaporate at 50° C. At the same temperature, a negative pressure was applied to the upper end, i.e., the opening end of the clad preform so as to conduct a degasfication treatment until the evaporation of the solvent was no longer observed. The thus-obtained composite material was then placed in an oven of 120° C., in which the composite material was left over for 8 hours to polymerize and harden the phenol resin monomer. As a result, a core was formed to fabricate an optical fiber of this invention.

The refractive index of the phenol resin core of the optical fiber was about 1.670 at 25° C.

The optical transmission loss of the optical fiber was determined in the same manner as in Example 1. It was smaller than about 3,000 dB/km at 25° C. It had sufficient light carrying capacity even at a high temperature of 150° C., thereby proving the possession of high heat resistance.

EXAMPLE 4

Following the procedure of Example 1, a polyvinylidene fluoride clad preform in the form of a hollow fiber, which was of the same type as that used in Example 1, was filled with a core material. The core material had been prepared by mixing under heat 0.5 mole (158 g) of 2,2-bis[4-(β-hydroexythoxy)-phenyl]propane, 0.5 mole (46 g) of glycerin and 1.25 moles (235 g) of methaxylylene diisocyanate and 0.05 g of tin di-n-butyl dilaurate, all of which had in advance been purified thoroughly. The composite material was allowed to stand for 5 hours in an oven of 65° C., thereby hardening the core material to form a core of polyurethane. An optical fiber of this invention was hence obtained. The refractive index of the core formed under the above hardening conditions was found to be about 1.56 at 25° C.

The optical transmission loss of the optical fiber was determined in the same manner as in Example 1. It was found to be about 1,600 dB/km. It had sufficient light carrying capacity even at a high temperature of 130° C., thereby proving the possession of high heat resistance.

Having now fully described the invention, it will be apparent to one of ordinary skill in the art that many changes and modifications can be made thereto without departing from the spirit or scope of the invention as set forth herein.

We claim:

1. A resin-made heat-resistant optical fiber comprising a core of a hardened thermosetting resin flowed and hardened inside a preformed cladding of a polymer or copolymer having a refractive index smaller by at least 1% than that of the core, said thermosetting resin being selected from the group consisting of flowable epoxy resins, phenol resins and urethane resins.

2. The resin-made heat-resistant optical fiber as claimed in claim 1, wherein the polymer or copolymer forming the cladding is a thermoplastic organic resin.

3. The resin-made heat-resistant optical fiber as claimed in claim 1, wherein the refractive index of the polymer or copolymer forming the cladding is smaller by at least 3% than that of the core.

4. The resin-made heat-resistant optical fiber as claimed in claim 1, wherein the optical fiber has been fabricated by filling a clad preform in the form of a hollow fiber, which is made of a polymer or copolymer and serves to form a cladding, with a flowable core material composed of at least one of thermosetting resins, polymerizable monomers capable of yielding thermosetting resins and mixtures thereof, and then subjecting the resultant composite material to a treatment inclusive of a heating step so as to convert the core material into a hardened thermosetting resin, thereby to form a core having a refractive index at least 1% greater than that of the cladding; and the hardened thermosetting resin is selected from the group consisting of epoxy resins, phenol resins and urethane resins.

* * * * *